Oct. 6, 1970 THOMAS O. PAINE, DEPUTY 3,533,001
ADMINISTRATOR OF THE NATIONAL AERONAUTICS
AND SPACE ADMINISTRATION
BROADBAND FREQUENCY DISCRIMINATOR
Filed May 21, 1968

INVENTOR.
SAMUEL SABAROFF
BY [signature]
[signature]
ATTORNEYS 3,533,001
Patented Oct. 6, 1970

3,533,001

BROADBAND FREQUENCY DISCRIMINATOR

Thomas O. Paine, Deputy Administrator of the National Aeronautics and Space Administration, with respect to an invention of Samuel Sabaroff, Woodland Hills, Calif.

Filed May 21, 1968, Ser. No. 730,700
Int. Cl. H03d 3/26
U.S. Cl. 329—140 8 Claims

ABSTRACT OF THE DISCLOSURE

A broadband frequency discriminator is disclosed which includes a pair of resistive-capactive-inductive (RCL) networks connected in parallel between an input terminal to which input signals are applied and ground. The inductor of one network and the capacitor of the other are connected in parallel. The output voltage is produced by detecting and combining the voltages across the other, non-parallel, inductor and capacitor.

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Field of the invention

This invention relates to frequency discriminator circuitry and, more particularly, to a relatively broadband simple frequency discriminator of the type used in FM demodulation.

Description of the prior art

Frequency discriminators have long been used to detect the frequency of radio frequency (RF) signals. The instantaneous amplitude of the discriminator's output signal is proportional to the difference between the input signal frequency and a center frequency. The polarity of the output signal reflects the sense of the input signal frequency above or below the center frequency.

Every frequency discriminator has a finite frequency band or range over which its output signal is indicative of the input signal frequency. In designing a frequency discriminator one strives to produce a circuit with a maximized bandwidth and one in which a linearly proportional relationship is present between the output signal, generally an output voltage, and the input signal frequency over most of the circuits frequency range. Herebefore, such characteristics, namely a wide frequency range and linearly proportional relationship between output voltage and input signal frequency could only be achieved with relatively complex and consequently expensive circuits. Also, the circuit complexity often results in reduced operational reliability and/or increased maintenance.

OBJECTS AND SUMMARY OF THE INVENTION

It is a primary object of the present invention to provide a new simple frequency discriminator.

Another object of the invention is to provide a frequency discriminator with a relative wide frequency range.

A further object of the invention is to provide a very reliable and simple frequency discriminator.

Still a further object of the invention is the provision of a simple, reliable, relatively inexpensive frequency discriminator with a relatively wide frequency range.

These and other objects of the invention are achieved with a frequency discriminator which includes a pair of L matched networks each connected in series with an input resistor between any input terminal to which an input signal is applied and a reference potential, such as ground. Separate detectors, in the form of diodes, are connected to the inductor of one network and the capacitor of the other. The rectified output voltages from the two detectors are combined in a summing output network consisting of a pair of series resistors and an output resistor, one end of which is connected to an output terminal and the other to ground.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
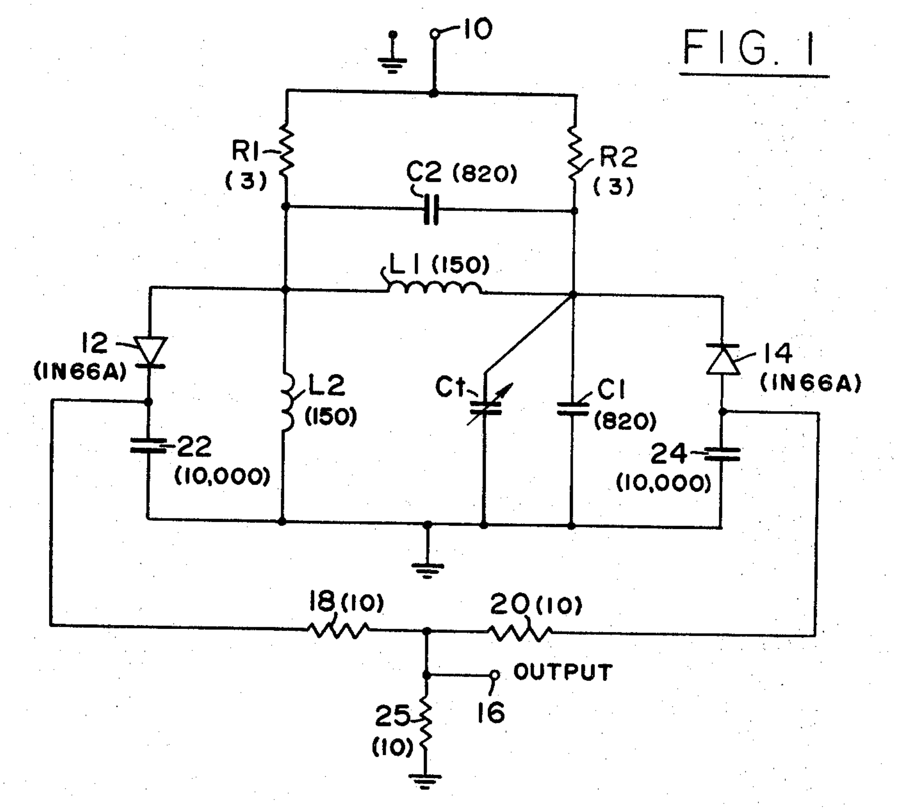
FIG. 1 is a schematic diagram of one embodiment of the invention.

Attention is now directed to FIG. 1 wherein one embodiment of the invention is shown comprising resistors R1 and R2, each having one end connected to an input terminal 10. The other ends of the two resistors are connected across the parallel combination of a capacitor C2 and an inductor L1. Resistor R1 is also connected to an inductor L2 and a detector such as a diode 12. Resistor R2 is also connected to a diode 14 and to a capacitor C1, which is shown shunted by a variable capacitor $C_t$.

The other ends of L2, C1 and $C_t$ are connected to a reference potential such as ground. The diodes 12 and 14 are connected to an output terminal 16 through resistors 18 and 20 respectively, and to ground, through respective RF bypass capacitors 22 and 24. An output resistor 25 is connected between output terminal 16 and ground. It is the voltage across resistor 25 which is related to the frequency of the input signals, applied between terminal 10 and ground.

The circuit thus far described may be thought of as consisting of two resistive-capacitive-inductive (RCL) combinations, such as R1, L1, C1 and R2, C2, L2, which are connected between the input terminal 10 and ground. The voltages across L2 and C1 are detected by detectors 12 and 14 respectively, and are summed up by resistors 18 and 20 to produce a summed-up voltage across resistor 25. In the particular embodiment $R1=R2$, $C1=C2$ and $L1=L2$. Center frequency adjustment is accomplished by the adjustment of trimming capacitor $C_t$. The center frequency and the upper bandedge and lower bandedge of the discriminator may be expressed as follows:

$$\text{center frequency} \approx \frac{1}{\sqrt{LC}} = \omega_0$$

$$\text{upper bandedge} \approx \omega_0\sqrt{2}$$

$$\text{lower bandedge} \approx \omega_0/\sqrt{2}$$

In FIG. 1 the terms in parenthesis next to each component represent component values or types actually employed in one reduction to practice. In the particular embodiment the discriminator was designed for a center frequency of 455 kHz. The bandwidth of the discriminator was more than 100 kHz. In FIG. 1, resistance is in kilohms (KΩ) capacitance in micromicrofarads (μμf.) and inductance in (microhenries) μH.

Figure 2:
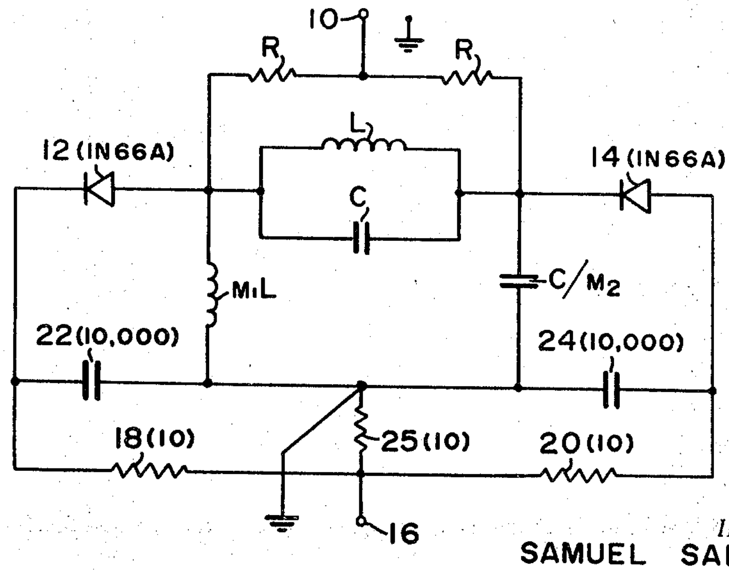
FIG. 2 is a schematic diagram of another embodiment of the invention.

If desired the trimming capacitor $C_t$ may be eliminated and replaced by varying the values of L2 with respect to L1, and C1 with respect to C2. Such an arrangement is shown in FIG. 2 in which R1 and R2 are designated simply by R, C2 by C, L1 by L, L2 by $M_1L$, and C1 by $C/M_2$, where $M_1$ and $M_2$ are multiplying factors. Adjustment of $M_1$ and $M_2$ enables the optimization of linearity for a predescribed bandwidth. Also, the values of R may be adjusted for linearity, sensitivity and bandwidth. When $M_1=M_2=M$, the percent bandwidth upper bandedge and lower bandedge may be expressed as follows:

$$\text{percent bandwidth}=1/\sqrt{M(1+M)}$$

$$\text{upper bandedge}=\omega_0\sqrt{\frac{1+M}{M}}$$

$$\text{lower bandedge}=\omega_0\sqrt{\frac{M}{1+M}}$$

When M is large, then $$\text{percent bandwidth}\approx 1/M$$

$$\text{upper bandedge}\approx \omega_0\left(1+\frac{1}{2M}\right)$$

$$\text{lower bandedge}\approx \omega_0\left(1-\frac{1}{2M}\right)$$

There has accordingly been shown and described herein a novel frequency discriminator which requires a minimum number of components, It is simple in construction and provides a wider bandwidth response than prior art discriminators of similar complexity.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A frequency discriminator circuit for providing an output signal whose amplitude is a function of the frequency of input signals comprising:
- a first series resistive-capacitive-inductive network connected between an input terminal to which input signals are applied and a reference potential;
- a second series resistive-capacitive-inductive network connected said input terminal and said reference potential;
- means for connecting only the capacitive element of said second network in parallel with only the inductive element of said first network so as to form a tank circuit which consists of only the inductive and capacitive elements of said first and second networks, respectively; and
- means for detecting and adding signals across the inductive element of said second network and the capacitive element of said first network to provide said output signal.

2. The circuit as recited in claim 1 wherein, the capacitive elements in said networks are equal and the inductive elements in said networks are equal, said circuit further including adjustable means for adjusting the center frequency of said circuit.

3. The circuit as recited in claim 2 wherein said adjustable means is a variable capacitor connected across the capacitive element of said first network.

4. The circuit as recited in claim 1 wherein the values of the capacitive elements of said first and second networks are $C/M$ and C respectively, and the values of the inductive elements of said first and second networks are L and ML, where M is an adjustment factor.

5. A frequency discriminator circuit comprising:
- an input terminal;
- first and second resistors each having one end connected to said input terminal;
- first and second inductors;
- first and second capacitors;
- means connecting said first inductor and said second capacitor in parallel across the other ends of said first and second resistors so as to form a tank circuit consisting only of said first inductor and said second capacitor;
- means connecting said second inductor between the junction point of said first resistor and first inductor and a ground reference potential;
- means connecting said first capacitor between the junction of said second resistor and said second capacitor and said ground reference potential; and
- signal detecting and summing means coupled to the ungrounded ends of said first capacitor and said second inductor for providing an output voltage of an amplitude with respect to said ground reference potential which is a function of the frequency of input signals applied at said input terminal.

6. The circuit as recited in claim 5 wherein the first resistor, first capacitor and first inductor, respectively equals said second resistor, said second capacitor and said second inductor.

7. The circuit as recited in claim 6 further including a variable capacitor connected across said first capacitor for adjusting the effective capacitance thereacross.

8. The circuit as recited in claim 5 wherein said first and second inductors have related values L and ML, and said first and second capacitors have related values $C/M$ and C, where L and C represent inductance and capacitance values and M is an integer.

References Cited

UNITED STATES PATENTS

| | | | |
|---|---|---|---|
| 2,312,070 | 2/1943 | Bliss | 329—142 X |
| 2,969,468 | 1/1961 | Hogue | 307—232 |
| 3,024,421 | 3/1962 | Clark | 329—143 |
| 3,076,940 | 2/1963 | Davis et al. | 329—142 X |
| 3,421,094 | 1/1969 | Gammel | 307—232 X |

ALFRED L. BRODY, Primary Examiner

U.S. Cl. X.R.

307—233; 329—142